United States Patent [19]

Fatehi et al.

[11] Patent Number: 5,181,134
[45] Date of Patent: Jan. 19, 1993

[54] PHOTONIC CROSS-CONNECT SWITCH

[75] Inventors: Mohammad T. Fatehi, Middletown; Nattu V. Srinivasan, Eatontown, both of N.J.

[73] Assignee: AT&T Bell Laboratories, Murray Hill, N.J.

[21] Appl. No.: 669,840

[22] Filed: Mar. 15, 1991

[51] Int. Cl.$^5$ ............................................. H04J 14/00
[52] U.S. Cl. .................................... 359/117; 359/128; 385/17
[58] Field of Search ............... 359/128, 134, 139, 160, 359/117-118, 120-121, 108, 341; 372/6; 385/16, 17

[56] References Cited

U.S. PATENT DOCUMENTS

| | | | |
|---|---|---|---|
| 4,787,692 | 11/1988 | Spanke | 385/17 |
| 4,922,479 | 5/1990 | Su | 359/139 |
| 4,932,735 | 6/1990 | Koai | 385/17 |
| 4,964,131 | 10/1990 | Liu et al. | 372/6 |
| 5,007,698 | 4/1991 | Sasaki et al. | 372/6 |
| 5,058,974 | 10/1991 | Mollenauer | 372/6 |

Primary Examiner—Edward L. Coles, Sr.
Assistant Examiner—Kinfe-Michael Negash
Attorney, Agent, or Firm—E. Weiss

[57] ABSTRACT

This invention relates to an optical cross-connect switch which is substantially loss-less and is transparent to signal bit rate, format and modulation scheme. The optical cross-connect switch can be comprised of at least two stages of chips coupled in tandem via optical fibers. Each chip can be of lithium niobate having a plurality of digital switch elements or directional couplers which, by means of an electric field, can selectively switch optical energy from one waveguide to another. The chips are coupled together via optical fiber amplifiers and the optical fiber amplifiers are pumped by optical pumps, e.g., 1.48 μm CW, laser pumps, coupled to appropriate nodes within either one or both of the chips. In operation, the pump energy is switched through the chips along with the optical data signals to pump only those optical fiber amplifiers which are in the optical data signal path.

8 Claims, 12 Drawing Sheets

PHOTONIC CROSS-CONNECT SWITCH

TECHNICAL FIELD

This invention relates generally to communication networks and, more particularly, to cross-connect switches for routing optical signals from input ports to selected output ports.

BACKGROUND OF THE INVENTION

Present day commercial lightwave systems use optical fibers to carry large amounts of multiplexed information over long distances from a transmit terminal to a receive terminal. Most long-haul transmission lines and a substantial portion of short-haul transmission lines such as inter-office and intra-office links, local area networks (LAN) and metropolitan area networks (MAN) are optical and, therefore, the information is carried over an optical fiber. A major advantage of transmitting information in optical form is the very large bandwidth and low losses associated with single mode optical fiber.

In a communication network, it is normally essential that signals from many transmission lines be cross-connected or switched to other transmission lines to provide flexibility and to permit traffic from one transmission line to be rerouted to diverse destinations. More specifically, switching is required in a network to provide A) provisioning; B) restoration in case of line failure; C) network reconfiguration; D) maintenance; E) operation; F) service, and the like.

At the present time, cross-connect switches used with optical transmission systems are either manual or electronic. In manual cross-connect switches the ends of the optical fibers are physically disconnected and reconnected to form new transmission paths. Electronic cross-connect switches which can connect up to 2048 input ports to 2048 output ports (2048×2048) are available. Unfortunately, however, using electronic cross-connect switches with optical networks has two major disadvantages. One is that the optical signal must be converted to electrical form prior to being coupled to the cross-connect switch; and converted back to optical form after leaving the output port of the cross-connect switch. The second disadvantage is that the electronic cross-connect switch can only operate at a data rate which is substantially less than that of the optical transmission line. The maximum data rate of a presently available electronic cross-connect switch is from 45 Mb/s to 155 Mb/s, whereas the data rate of an optical transmission line is about 2.5 Gb/s. Thus, because of this difference, the typical optical data signal carried by an optical transmission line must be converted to electrical form and then demultiplexed to its tributaries prior to being applied to the input ports of an electronic cross-connect switch.

Clearly, an improved cross-connect switch which can switch optical signals, in optical form, from one optical transmission line to another optical transmission line is required.

SUMMARY OF THE INVENTION

This invention relates to an optical cross-connect switch which is substantially loss-less and is transparent to signal bit rate, format and modulation scheme. The optical cross-connect switch can be comprised of at least two groups or stages chips coupled in tandem via optical fibers. Each chip can be of lithium niobate having a plurality of digital switch elements or directional couplers which, by means of an electric field, can selectively switch optical energy from one waveguide to another. The chips are coupled together via optical fiber amplifers and the optical fiber amplifers are pumped by optical pumps, e.g., 1.48 μm CW laser pumps coupled to appropriate nodes within either one or both of the chips. In operation, the pump energy is switched through the chips along with the optical data signals to pump only those optical fiber amplifiers which are in the optical data signal path.

DETAILED DESCRIPTION

Lithium niobate switches permit rapid switching of optical signals without reconversion to electrical form. By diffusing strips of titanium into a $LiNbO_3$ substrate, single mode waveguides with high refractive indices are produced. When a voltage is applied across these guides, a refractive index change occurs due to the high electrooptic coefficient of $LiNbO_3$. This results in a change in the cross-coupling between guides and allows optical power to be switched from one guide to the other. Two types of lithium niobate switches are commercially available. One type is normally identified as being a "directional coupler" and the other is identified as being a "digital switch".

Figures 1, 1A:
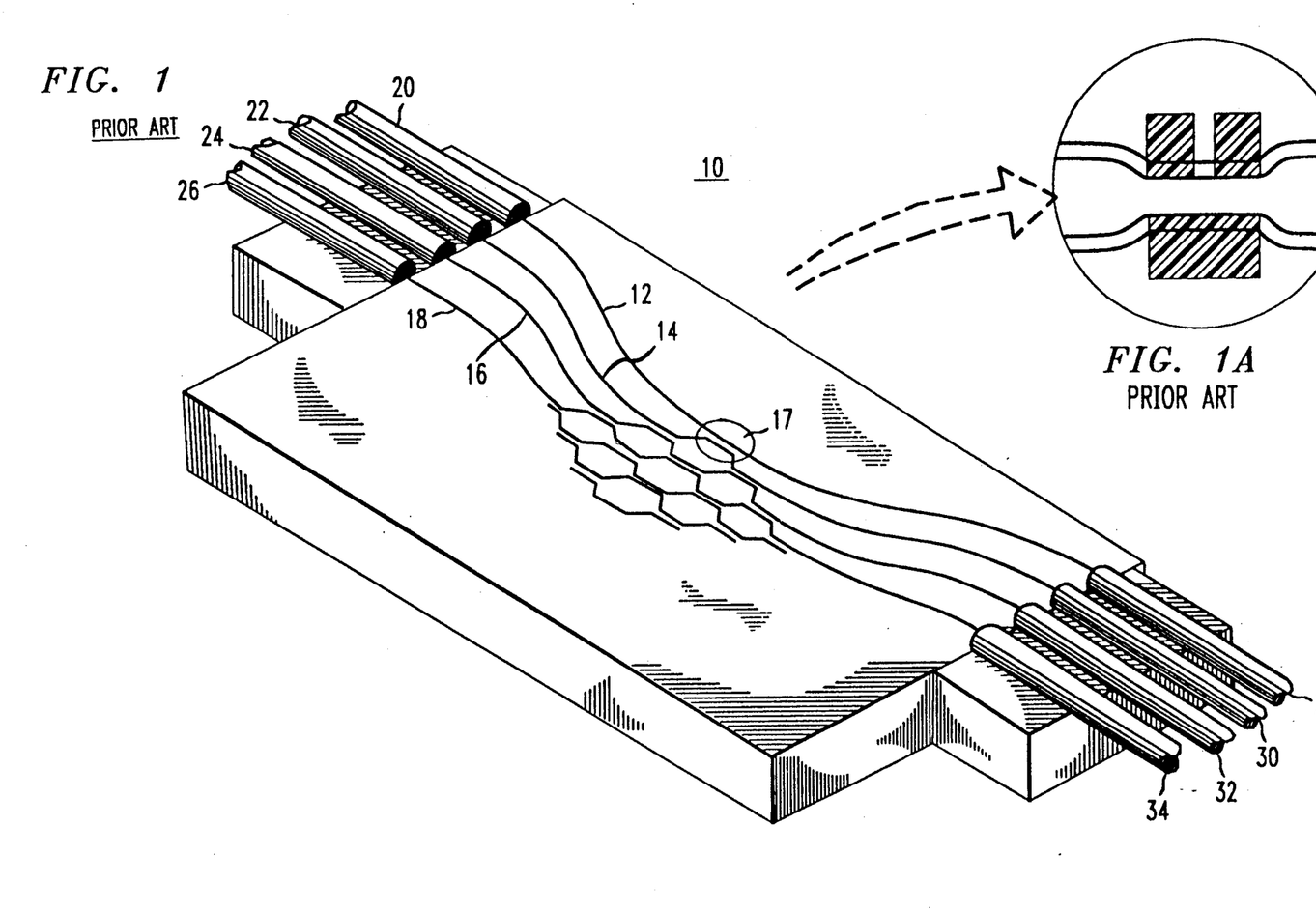
FIG. 1 is an illustration of a prior art 4×4 lithium niobate switch matrix.

Referring to FIG. 1, there is illustrated a prior art 4×4 lithium niobate cross-connect switch 10 using switches which are identified as being directional couplers. The cross-connect switch normally comprises a plurality of embedded waveguides 12, 14, 16, 18 fabricated in a crystal of dielectric material, such as $LiNbO_3$, or of a semi-insulating material, such as Fe-doped InGaAs P/InP. Single-mode $Ti:LiNbO_3$ waveguide devices have mode spot sizes which closely match the mode spot sizes of typical single-mode fibers. A p-n, p-i-n, or Schottky junction 17 is employed to attain an electric field in the waveguide volume of the semiconducting material to effect switching of optical energy from one optical fiber to another, for example, from 12 to 14 by means of an electric field which selectively changes the electrooptic index of the material. The input ports of the waveguide 12, 14, 16, 18 are normally coupled to receive optical signals from optical transmission paths or optical fibers 20, 22, 24, 26; and the output ports of the waveguides are coupled to transmit the switched optical signals to optical transmission paths or optical fibers 28, 30, 32, 34. Briefly, by applying an appropriate control voltage to corresponding electrodes of the directional coupler, each directional coupler 17 in the chip operates as a 2×2 directional coupler switch. The control voltage varies the index of refraction of the Ti:LiNbO$_3$ channel which results in a modification of the optical length of the coupler.

Figure 2:
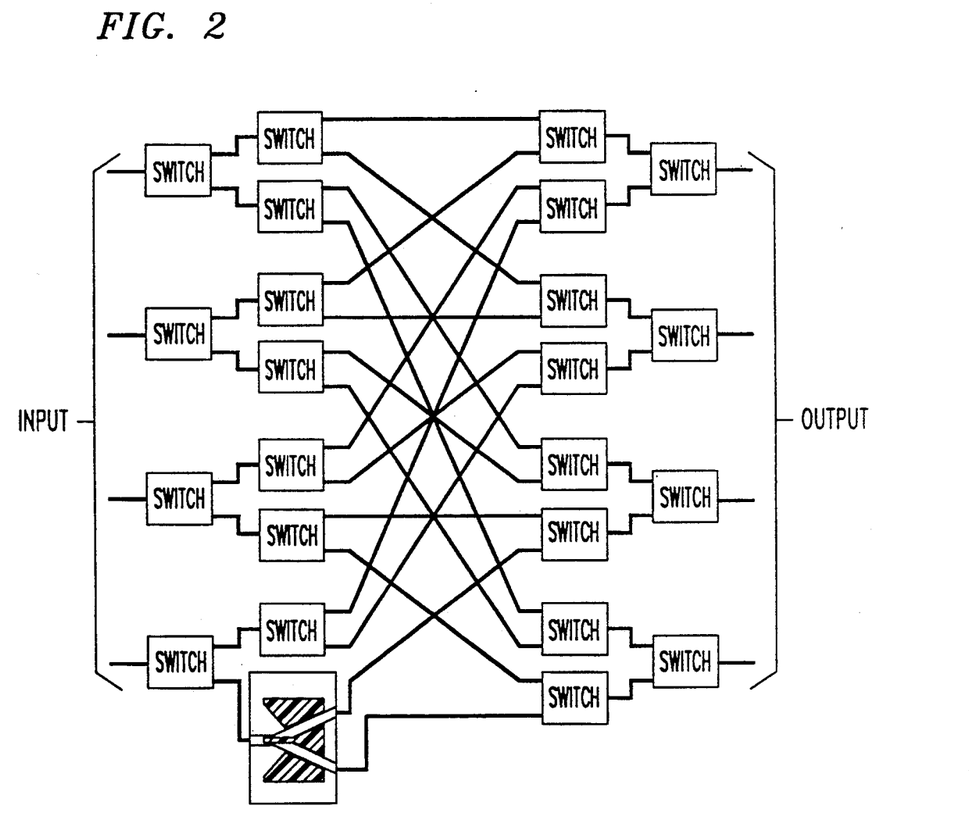
FIG. 2 is an illustration of another prior art 4×4 lithium niobate switch matrix.

Referring to FIG. 2, there is illustrated a prior art 4×4 lithium niobate cross-connect switch comprising digital switches or intersecting waveguides or total internal reflection type switches. While the construction of the switching elements are different, they each use a control voltage to switch an optical data signal along a selected optical path by varying the refractive index of the optical path. The cross-connect switch of this invention can use either the directional coupler of FIG. 1 or the digital switches or intersecting waveguide of FIG. 2. It is here understood that when the term "switch" is used in this description, it means either a directional coupler type of switch of FIG. 1 or a digital type of switch of FIG. 2, or any other type of switch which uses an electrical control signal to direct an optical signal along a selected optical path.

A primary advantage of the LiNbO$_3$ type of switch is that it has a very high through-put bandwidth which is compatible with optical fiber. In addition, it can switch at relatively high speeds.

However, lithium niobate switches have two limitations. The first is that lithium niobate chips are lossy. In addition to the losses within the chip which is due to the presence of the "switches", a major component of the loss also results from the coupling of round optical fiber input-output paths to the rectangular waveguide channels in the lithium niobate chip. Typically, from the input path to the output path, the switch can have a loss of from 6 dB to 10 dB. The second limitation is the physical constraints that are imposed such as minimum coupler length, minimum bending radius and the like. These physical constraints place severe limitations on the number of switches that can be placed on a single chip.

To circumvent the second limitation, a cross-connect switch will typically comprise a plurality of small switches connected to form an array of switches connected to optical fibers. FIGS. 1 and 2 illustrates an array. Typically, arrays are coupled together, in tandem, to form stages. Unfortunately, when arrays of small switches are coupled together, the incoming optical signals must travel through a number of switching stages prior to reaching the designated output port. Thus, the losses within the fabric will increase as the number of switching stages are increased in addition to those losses which are associated with the various connectors and the interconnect fabric.

Figure 3:
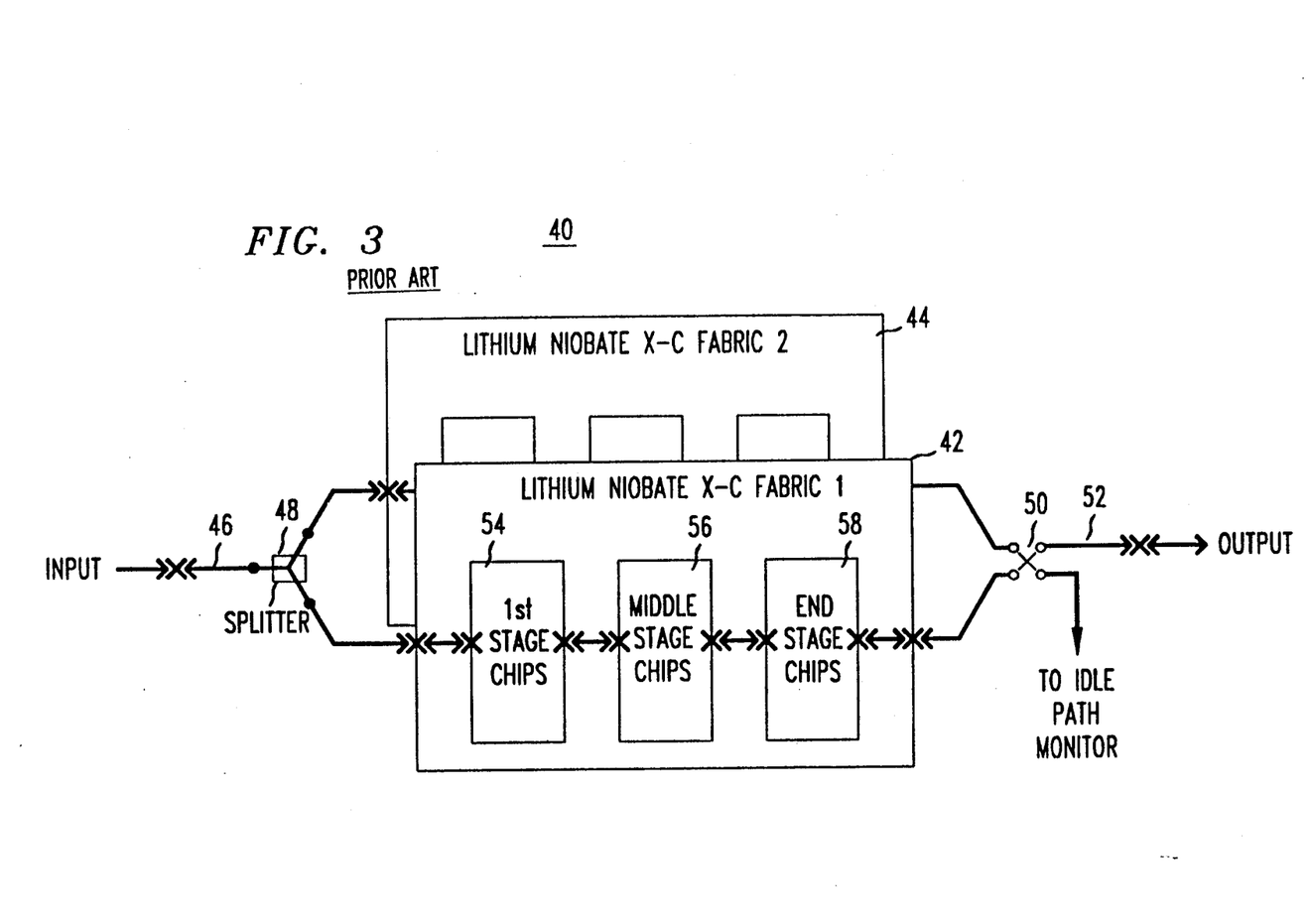
FIG. 3 is an illustration of a typical prior art switch fabric architecture; for use at the line rate without demultiplexing the received optical signal to its tributary rate.
Figure 4:
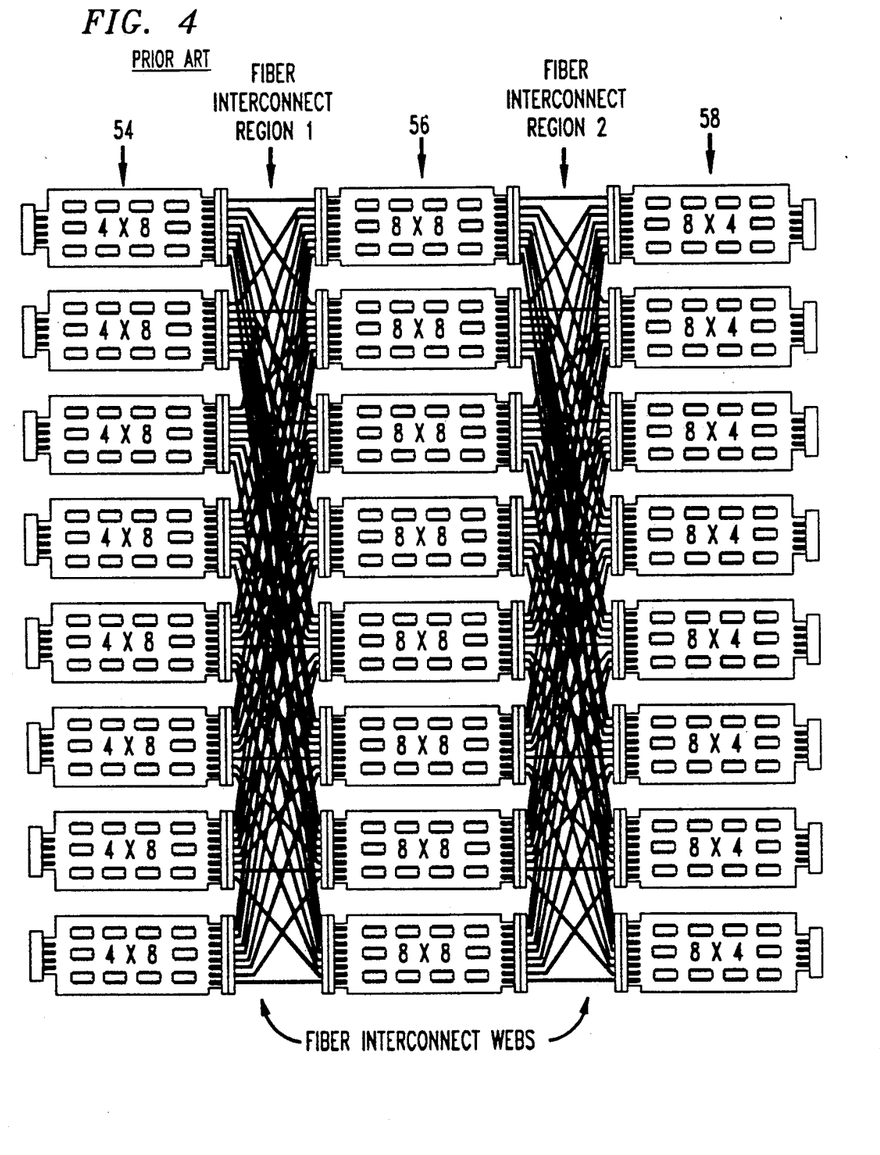
FIG. 4 illustrates a prior art 32×32 optical switch fabric architecture.

Referring to FIG. 3, there is illustrated a typical dual-fabric architecture for use at the line rate without demultiplexing the received optical signal to its tributary rate. The architecture can be made to perform general cross-connections, provisioning, line protection switching, restoration and the like. A modest switch size of 32×32 is illustrated in FIG. 4. Returning to FIG. 3, to meet normal reliability requirements, the system 40 can comprise two identical lithium niobate switch fabrics 42, 44 where each fabric contains three stages. The optical signal from each of thirty two incoming optical fibers 46 is split via a 3 dB splitter 48 and connected to a corresponding input port of each of the two fabrics 42, 44. Thus, one-half of the input power is received by each fabric. A tail-end mechanical-optical switch 50 is provided for each output port to select the optical fiber that has the best signal and route that signal to an outgoing optical fiber 52. Each switch fabric is comprised of three stages of lithium niobate switches 54, 56, 58, more fully illustrated in FIG. 4.

It is to be noted that there are significant losses in a cross-connect switch. It is relatively accurate to assume a loss of about 5 dB for each lithium niobate stage 54, 56, 58 and the associated optical connectors; a 3.5 dB to 4 dB loss for the input 3 dB splitter 48, and, a 1 dB loss for the tail end mechanical-optical switch 50. Thus, the dual fabric cross-connect switch of FIG. 3 has a loss of approximately 20 dB.

Under normal conditions, a loss of 20 dB or greater from a typical transmitter to a receiver in a lightwave transmission system cannot be tolerated because with this high loss there is no power left to compensate for any optical fiber facility loss. Therefore, with the structure of FIG. 3, expensive lightwave regenerators are required at each input port and each output port of the cross-connect switch to compensate for this loss. In a 32×32 cross-connect switch, sixty four regenerators are required. The result is a system which is not only expensive to build, but is also cumbersome to use. Additionally, the regenerators are designed to operate at a specific data-rate. Therefore, if the cross-connect switch is to be used with a signal of another data rate or format then the regenerators must be changed.

Referring to FIG. 4, a 32×32 non-blocking, fully connected cross-connect switch fabric can comprise 3 stages of 4×8, 8×8 and 8×4 lithium niobate switches interconnected with optical fiber webs. Each stage of the cross-connect switch can have eight chips. In addition to the lithium niobate switches which are responsible for routing the optical signals, electronic controllers and drivers are also required to configure each switch element.

Figure 5:
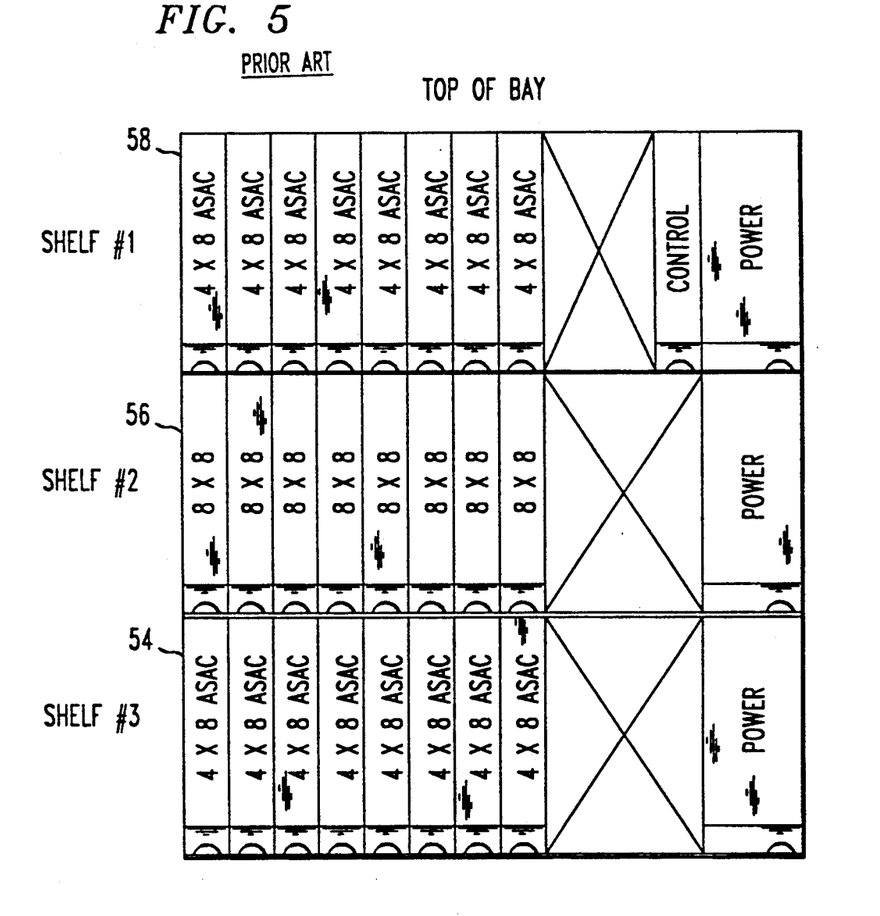
FIG. 5 illustrates a prior art bay layout for one or two switch fabric.

FIG. 5 illustrates a bay arrangement of a 32×32 cross-connect switch. The switches of the different stages are positioned into appropriate slots of the bay, i.e. the switches 54 which comprise the first stage are in shelf 3; the switches 56 which comprise the second stage are in shelf 2, and the switches 58 which comprise the third stage are in shelf 1.

Figure 6:
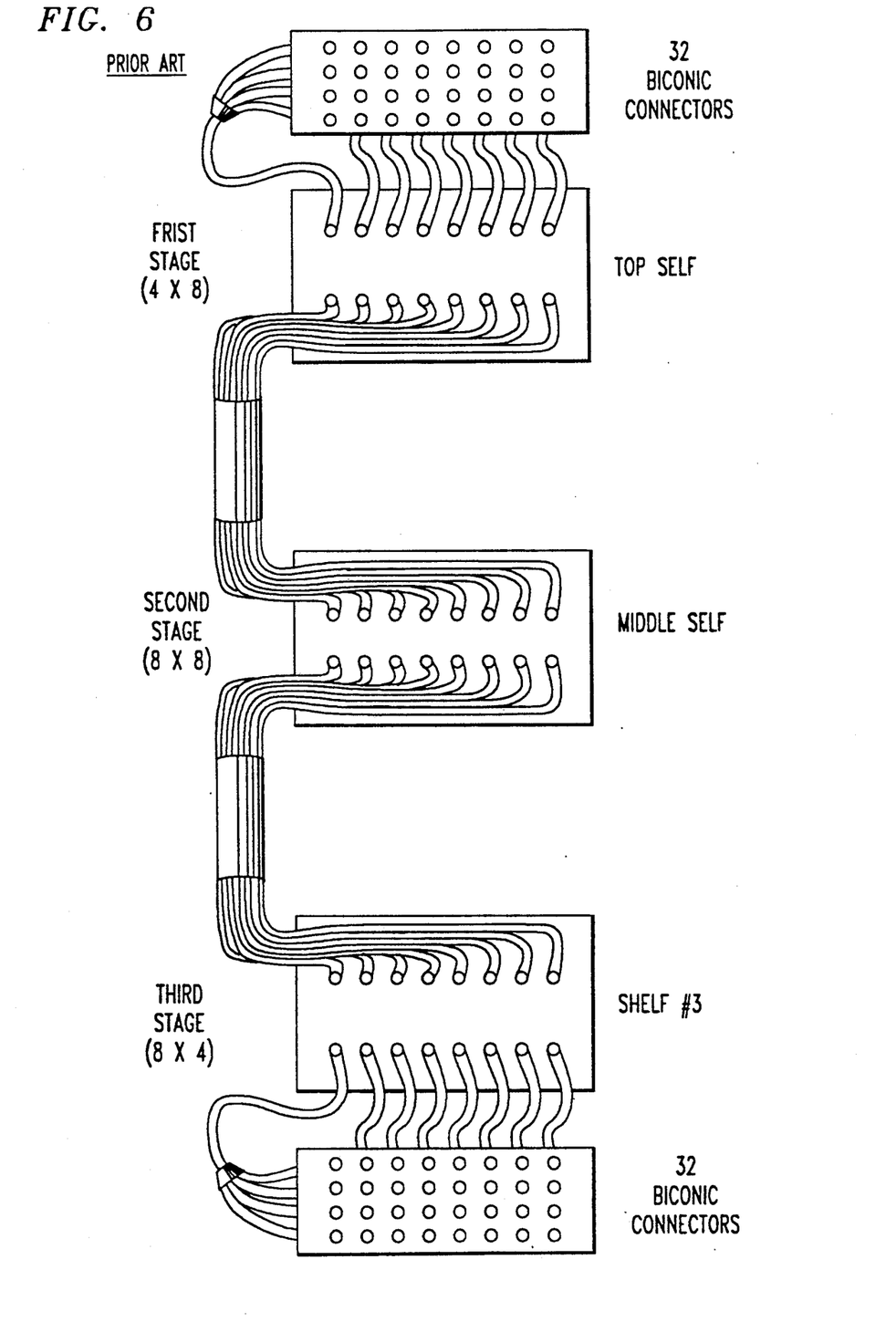
FIG. 6 illustrates the backplane optical interconnection of a prior art 32×32 cross-connect switch.

FIG. 6 illustrates the optical interconnects in the backplane of a 32×32 cross-connect switch. The electrical backplane interconnections which are normally made via printed circuits are not shown. For each backplane-to-switch assembly connector, a bundle of optical fibers are routed along the shelf and distributed in the web to the connectors of the other stages or to the optical input/output port. The length of these optical fiber bundles can be twenty meters or longer, depending upon the routing and cabling design.

Figure 7:
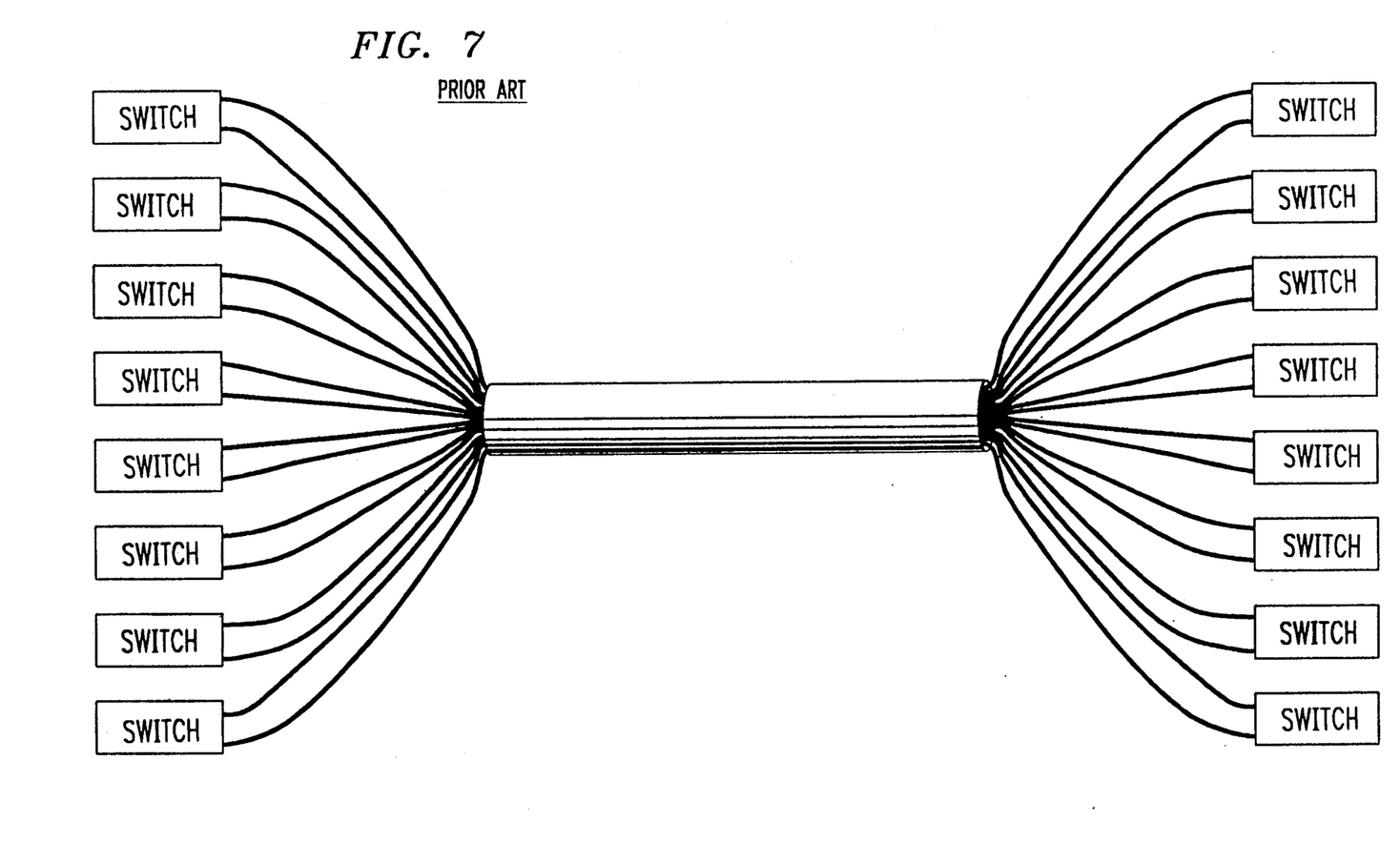
FIG. 7 illustrates a typical prior art optical fiber interconnect bundle.

FIG. 7 illustrates a typical optical fiber inter-connect bundle. It is to be noted that for the architecture of FIG. 3, there are 8×8=64 optical fibers in each bundle of interconnect optical fibers. These fibers are standard single mode optical fibers.

To further illustrate the difficulty of using lossy lithium niobate cross-connect switches in large switch fabrics, reference is made to a 512×512 cross-connect switch.

Figure 8:
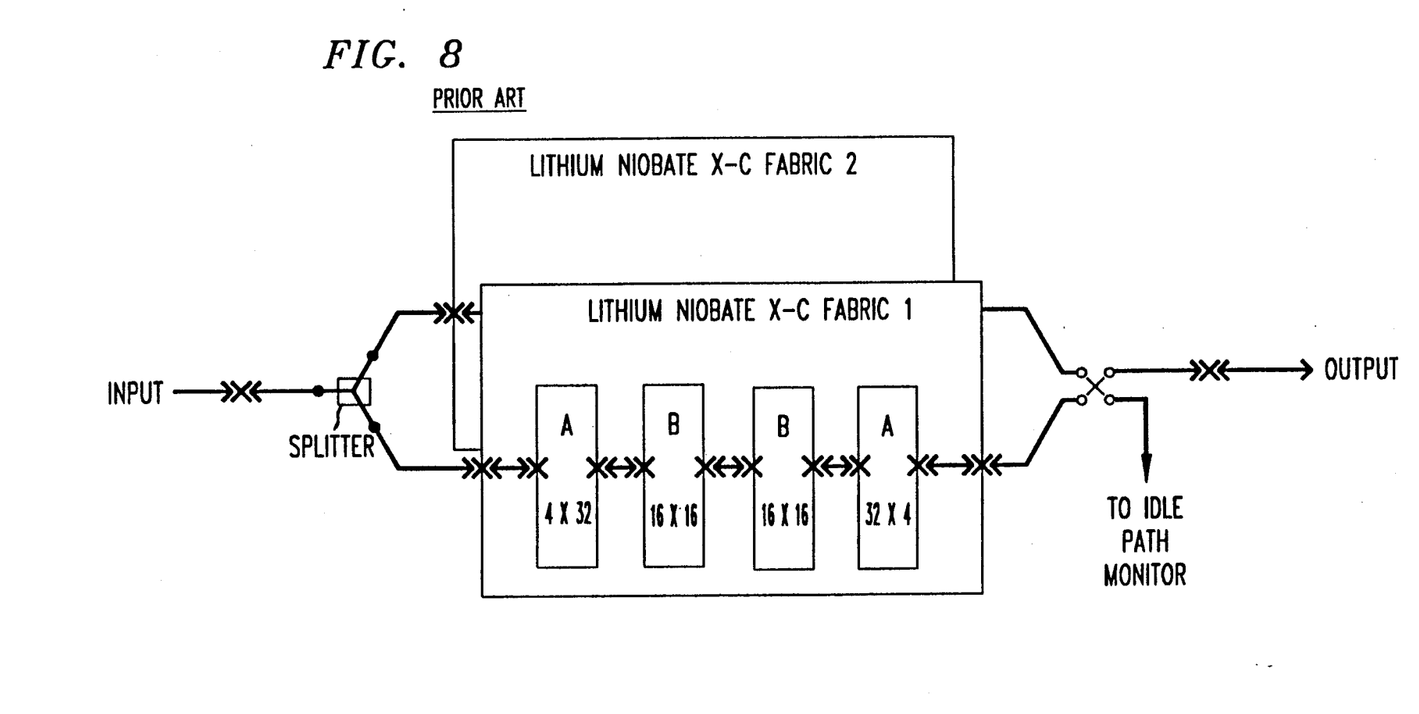
FIG. 8 illustrates a prior art 512×512 dual-fabric optical cross-connect switch.

Referring to FIG. 8, there is illustrated a 512×512 dual-Fabric optical cross-connect switch. If 16×16 and 4×32 lithium niobate switches are used, a 512×512 strictly non-blocking cross-connect switch fabric can be made from four stages of switches. Again, if it is assumed that there is 5 dB loss for each switch stage, then the switch fabric loss is a minimum of 20 dB and the minimum total cross-connect switch loss is 25 dB. In addition, the 512×512 cross-connect switch requires 512×2=1024 regenerators to enable it to be usable in a system. Furthermore, and similar to the 32×32 cross-connect switch, each interconnect web contains of 4096 optical fibers.

This invention here disclosed is directed toward a new optical cross-connect switch which does not have the shortcomings of current cross-connect switches.

Specifically, in this invention, the optical cross-connect switch comprises lithium niobate directional coupler or digital switch arrays as switching elements and erbium-doped fiber optical amplifiers as gain elements to provide a cross-connect switch which is essentially loss-less.

In accordance with the principle of the invention, there are two ways in which an erbium-doped optical fiber amplifier can be used to compensate for losses in a lossy multistage optical cross-connect switch fabric.

One way is to have an optical fiber amplifier as the input and/or the output of the cross-connect switch. With this arrangement the cross-connect switch becomes bit-rate and format independent as well as being more cost effective.

In the second way, the gain element, the erbium-doped optical fiber amplifier is used as the interconnect fiber web between the switching elements.

In each embodiment, the erbium-doped optical fiber amplifier can be pumped from the input and/or output ports of the optical cross-connect switch in a distributed manner.

Over the last few years significant progress has been made in the field of optical amplifiers. Experiments directed toward long-haul applications with erbium-doped optical fiber amplifiers operating in the 1.5 μm wavelength region have been conducted successfully. An erbium-doped fiber amplifier is an optical device capable of amplifying optical input signals in the 1.5 μm region, independent of signal bit rate, format, and modulation requirements. In its basic structure, it can consists of 2-20 meters or more length of erbium-doped, 50-500 ppm. fiber optically pumped by a high power CW laser at essentially 1.48 μm via a wavelength division multiplexing coupler. It is understood that other pump wavelengths are possible. The input and output signal fibers are coupled to the input and output ports of the erbium fiber section. The pump light can be injected into the doped optical fibers from the input side (co-propagating pumping) or from the output side (counter-propagating pumping) through the coupler. The pump laser excites the erbium atoms in the optical fiber to a high energy state and optical amplification occurs by stimulated emission.

Figure 9:
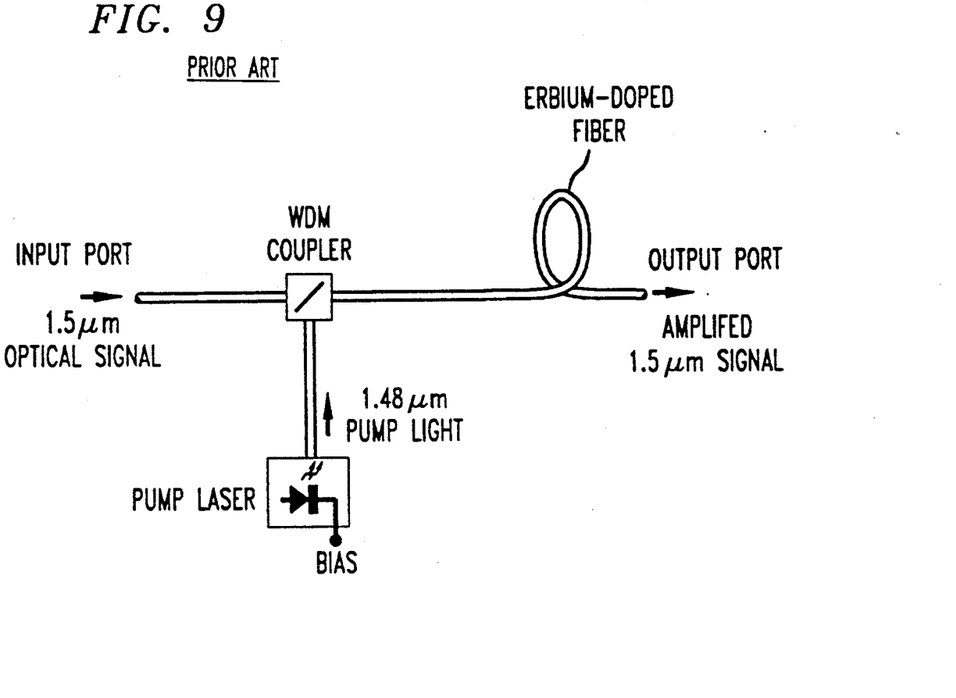
FIG. 9 illustrates a typical prior art erbium-doped fiber amplifier with co-propagating pumping.
Figure 10:
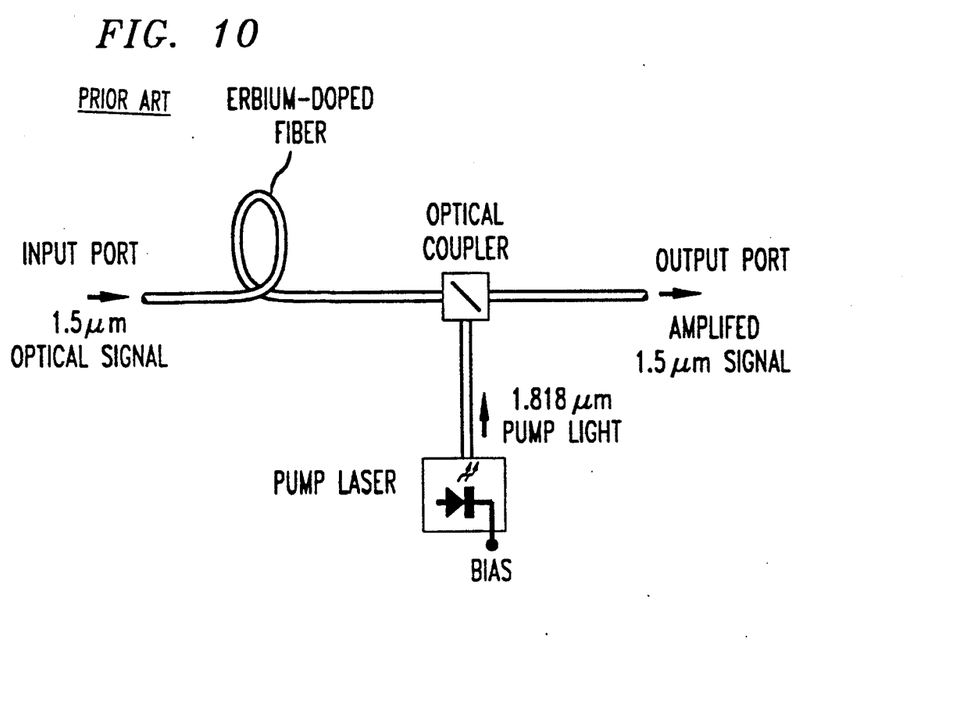
FIG. 10 illustrates a typical prior art erbium-doped fiber amplifier with counter propagating pumping.

Referring to FIG. 9, there is illustrated a typical rare earth doped optical fiber amplifier with co-propagating pumping; and, FIG. 10 illustrates a typical rare earth doped fiber amplifier with counter-propagating pumping. The rare earth doped fibers are physically compatible to standard optical fibers used in optical transmission systems. Erbium is a common dopant for optical fiber amplifiers.

Currently, the many applications of an optical fiber amplifier fall into two basic categories in transmission systems. A first category, which is defined as a long haul pipe, uses an optical amplifier as an analog repeater to amplify single or multiple channels (wavelength division multiplexed) 1.55 μm range signals, independent of the actual line rate. The primary motivation for using an optical fiber amplifier is the potentially lower cost of the optical amplifier compared to that of a regenerator. A second category, which is defined as a range extender for long span applications, uses an optical fiber amplifier as a power-amplifier to increase transmitted power and/or as a preamplifier to increase receiver sensitivity or both. This embodiment can increase span lengths for repeaterless lightwave systems.

There is now disclosed a new use for an optical fiber amplifier, that of using an optical fiber amplifier in combination with lithium niobate switches to provide a substantially loss-less cross-connect switch. More specifically, in this invention optical fiber amplifiers are used as the optical fiber interconnect web of a lithium niobate cross-connect switch. In an embodiment of the invention here disclosed, the pump power can be selectively distributed to the optical fibers from the input and/or output ports rather than having each optical fiber amplifier being pumped individually. Thus, in this invention, the total number of laser pumps required is reduced from the number of optical fiber amplifiers in a web (4096 for a 512×512 cross-connect switch) to the number of input ports (512 for a 512×512 cross-connect switch) and/or output ports of the cross-connect switch.

Figure 11:
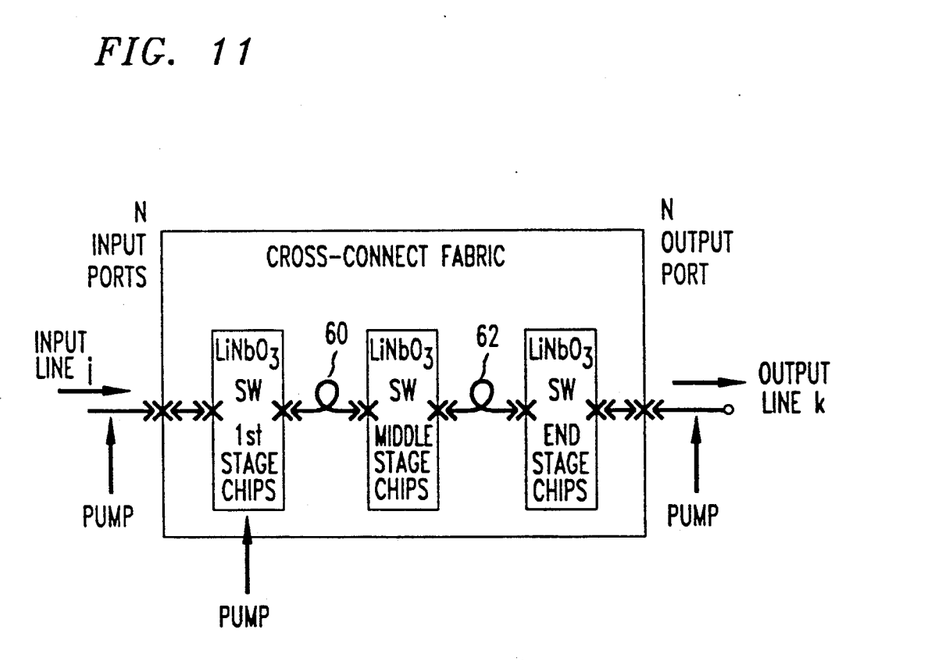
FIG. 11 illustrates a typical three stage cross-connect switch in accordance with the principle of the invention.

FIG. 11 illustrates a typical three stage cross-connect switch in accordance with the principles of the invention. In FIG. 11, the interconnect webs 60, 62 are erbium-doped fibers. The pump energy for the erbium-doped fibers can be introduced at either the input ports or the output ports, or at nodes in one or more of the stages of the cross-connect switch. When the pump energy is introduced at the input ports, or at nodes in the first stage of chips, the erbium-doped fiber amplifiers are identified as having co-propagating pumping. When the pump energy is introduced at the output ports, or at nodes in the second or end stage of chips, the erbium-doped fiber amplifiers are identified as having counter-propagating pumping. And, when the pump energy is introduced at both the input ports and the output ports, and at nodes in the first and end stage of chips, the erbium-doped fiber amplifiers are identified as having bidirectional pumping. Clearly, when co-propagating or counter propagating pumping is used, the number of pumps required is equal to the number of input ports or output ports. It is to be noted that a separate pump for each of the many erbium-doped fiber amplifiers of the various webs is not required. When bidirectional pumping is used, the number of pumps required can be equal to the number of input and output ports. It is here noted that if the power of the pump (the CW laser) is greater than the power required to pump one optical fiber amplifier, than a single pump source can be used to pump multiple optical fiber amplifiers in a given inerconnect web. Clearly, than, in this instance, the number of laser pumps required is less than the number of input and/or output ports.

Figure 12:
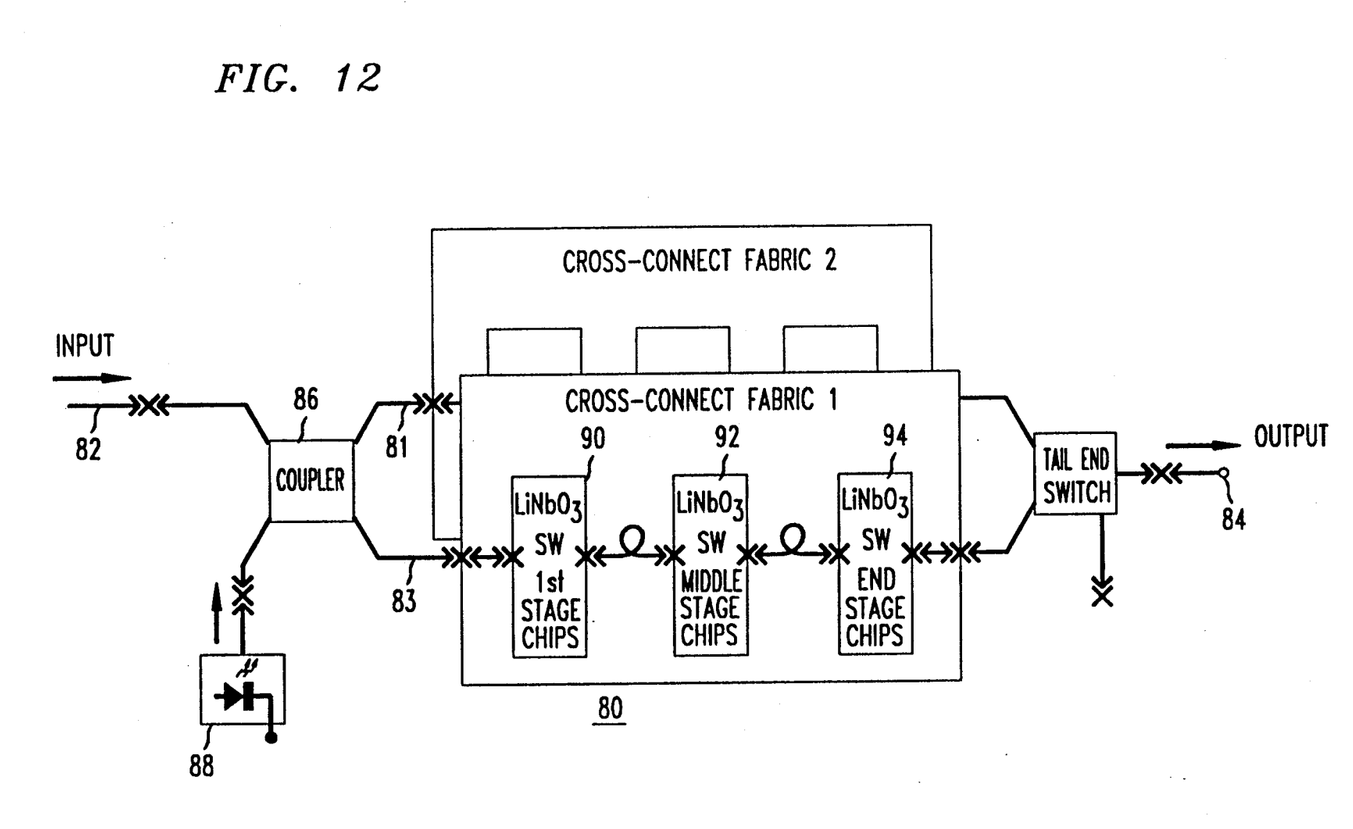
FIG. 12 illustrates structure in accordance with the principles of the invention with co-propagating pumping.

FIG. 12 illustrates a structure in accordance with the principles of the invention with co-propagating pumping. The optical cross-connect switch can be of a desired size such as 2×2, 4×4, 16×16 and the like. In this embodiment it is assumed, for convenience, that the optical cross-connect switch is a n×n switch. Thus, switch 80 has N input terminals and N output terminals. In FIG. 12, in an effort to avoid duplication, only one input port 82 and one output port 84 is illustrated. Each input port 82 is coupled via a passive 2×2 coupler or a 3 dB splitter 86 to two associated input ports, input port 83 on a first cross-connect fabric and input port 81 on a second cross-connect fabric. A pump source 88 such as a laser diode or the like is also coupled via passive coupler 86 to the same input terminals 81, 83. Thus, coupler 86 combines a received input data signal such as a 1.55 μm optical data signal with a pump signal which can be 1.48 μm and directs this combined signal to the input terminals 81, 83 of the two cross-connect fabrics. In operation, as the input signal on input terminal 82 is switched by the optical switches of the first stage 90 to the middle stage 92, the energy from the pump source 88 is also switched to follow the same path. Thus, the energy from the pump source is directed to pump only that erbium-doped fiber amplifier of the web of fibers between the first stage 90 and the second stage 92 which is selected to carry the received optical data signal from input terminal 82. In a similar manner, the energy from the pump source 88 can be used to pump only that erbium-doped optical fiber selected to carry the input signal from input terminal 82 as it moves from the middle stage chips 92 to the end stage chips 94.

Thus, the embodiment of FIG. 12 discloses remote pumping of the erbium-doped fiber amplifier paths of the interstage interconnect webs used to transport the optical data signals as they pass through the cross-connect switch. The number of pump sources 88 required is at most, equal to the number of input ports. Thus, for a N×N cross-connect switch in accordance with the principles of the invention where the interstage interconnect webs are comprised of erbium-doped fibers, only N pump sources are required. Obviously, the number of pump sources required will be reduced to less than the number of input terminals if a single pump source can be used to pump more than one erbium-doped fiber amplifier. In a similar manner, if a 512×512 cross-connect switch is being used, then, at most, only 512 pump sources are required to pump the erbium-doped optical fibers amplifier of the interstage interconnect fibers. In addition, the use of optical fiber amplifiers in an optical cross-connect switch as here disclosed eliminates the need for the currently required input and output regenerators. In other respects, the structure of the embodiment of FIG. 12 is similar to the structure of FIG. 3.

Figure 13:
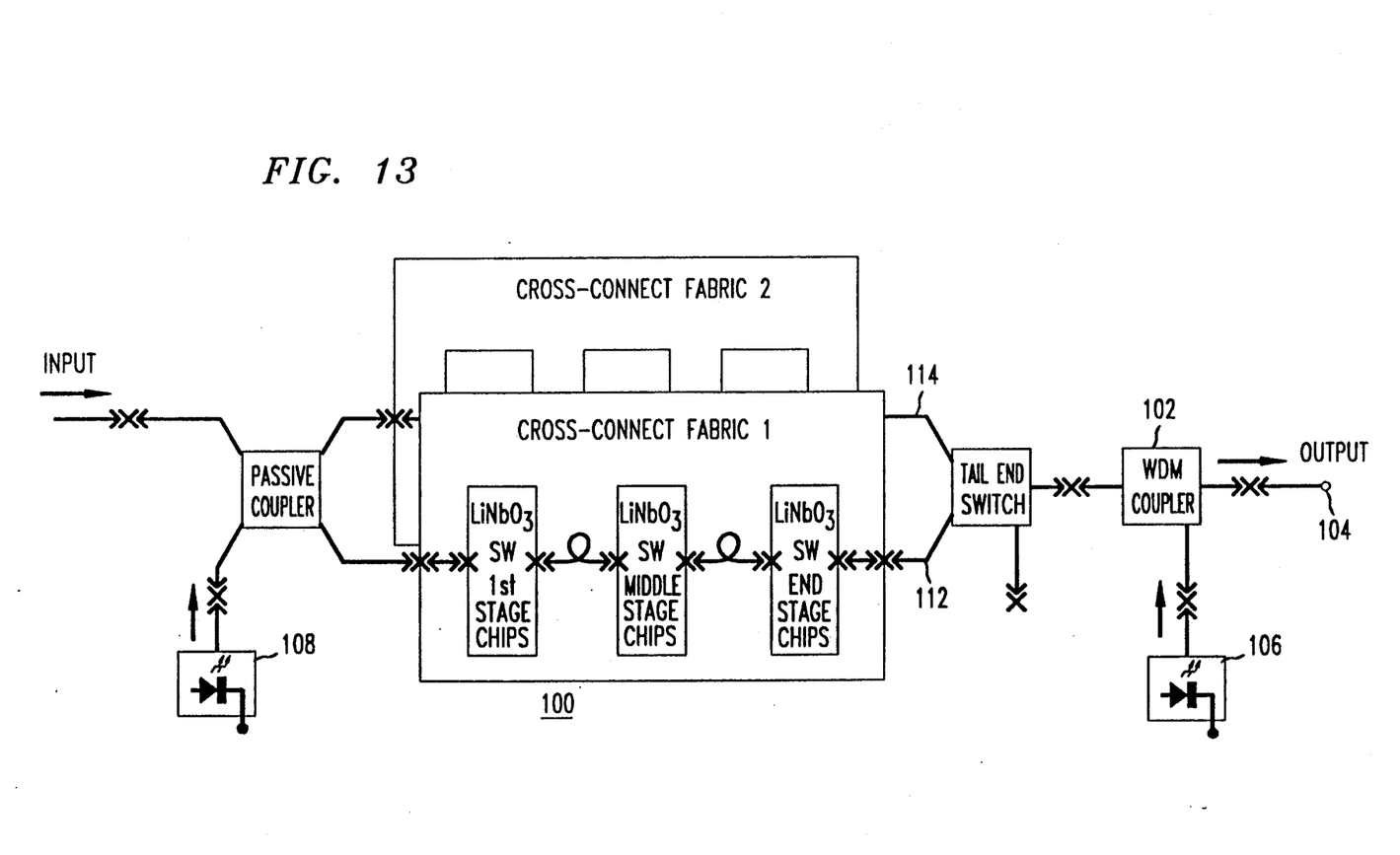
FIG. 13 illustrates structure in accordance with the principles of the invention with co-propagating and counter-propagating pumping.

Referring to FIG. 13, there is illustrated an embodiment of the invention wherein the interstage interconnect webs are selectively pumped from both the input ports and the output ports of the cross-connect switch. Each output port of the first and second fabrics of the cross-connect switch 100 is coupled to a tail end switch.

A wavelength division multiplex coupler 102 is coupled to pass a data output signal from the tail end switch to an output port 104. The wavelength division multiplex coupler is also coupled to pass the pump signal from pump means 106 to the output ports 112, 114 of the cross-connect coupler. In operation, the data signal from the cross-connect switch 100 which passes through the tail end switch is passed through wavelength division multiplex coupler 102 to output port 104. In addition, the pump signal from pump source 106 is passed by wavelength division multiplex coupler 102 and tail end switch to pump only those optical fiber amplifiers which are in the active paths of the interstage interconnect webs.

The embodiment of FIG. 13 illustrates bidirectional pumping; and, the embodiment of FIG. 12 illustrates co-propagating pumping. Elimination of the front end pump source 108 of FIG. 13 results in an embodiment of the invention which has counter-propagating pumping.

As noted for co-propagating pumping, with counter-propagating pumping or bidirectional pumping, the number of pump sources that are required is normally equal to the number of output ports 104.

In still another embodiment, the pump means can be coupled directly to the lithium niobate switches of the first stage of chips, or even to the middle stage chips and/or to the end stage of chips to pump the active paths of the interstage interconnect webs by appropriately routing the pump signal via external electrical controls.

It is understood that the dual fabric structure illustrates is not required for implementation of the cross-connect switch disclosed. The cross-connect switch can be made up of a single N×N fabric. In this instance, the purpose at the input and/or the output ports are coupled to these ports by means of 1.55/1.48 wavelength division multiplex couplers at the input and/or the output ports.

We claim:

1. An optical cross-connect switch comprising
   a first group of crystals of dielectric material
   a first group of waveguides supported by said first group of crystals of dielectric material for carrying optical signals from an input port to a selected output port,
   a first group of switching means coupled to said waveguides for selectively switching optical signals from said input ports along selective waveguides to said output ports,
   a second group of crystals of dielectric material,
   a second group of waveguides supported by said second group of crystals of dielectric material for carrying optical signals from an input port to a selected output port,
   a second group of switching means coupled to said waveguides for selectively switching optical signals from said input ports along selective waveguides to said output ports,
   optical fibers interposed between the output ports of said first group of waveguides and the input ports of said second group of waveguides to form an optical fiber interconnect web,
   said optical fibers comprise optical fiber amplifiers, and
   pump means coupled to pump said optical fiber amplifiers from a remote location.

2. The optical cross-connect switch of claim 1 wherein said pump means is coupled to the output ports of said second group of waveguides supported by said second group of crystals.

3. The optical cross-connect switch of claim 2 wherein
the number of input ports of said first group of waveguides supported by said first group of crystals is equal to the number of output ports of said second group of waveguides supported by said second group of crystals and less than the number of optical fibers of the optical fiber interconnect web.

4. The optical cross-connect switch of claim 1 wherein
said pump means is coupled to the input ports of said first group of waveguides supported by said first group of crystals.

5. The optical cross-connect switch of claim 4 wherein
the number of input ports of said first group of waveguides supported by said first group of crystals is equal to the number of output ports of said second group of waveguides supported by said second group of crystals and less than the number of optical fibers of the optical fiber interconnect web.

6. The optical cross-connect switch of claim 5 wherein said pump means comprises a laser pump coupled to said input ports.

7. The optical cross-connect switch of claim 6 wherein said pump means comprises a separate laser pump coupled to each of said input ports.

8. The optical cross-connect switch of claim 6 wherein said first group of waveguides are coupled to at least four input ports and said second group of waveguides are coupled to at least four output ports.

* * * * *